United States Patent [19]

Fick et al.

[11] Patent Number: 5,684,853
[45] Date of Patent: Nov. 4, 1997

[54] FLEXIBLE RADIOGRAPHIC CASSETTE HOLDER

[75] Inventors: Therese K. Fick; John Fick, both of Marine; Bradley J. Hansen, Forest Lake, all of Minn.

[73] Assignee: Minnesota Mining and Manufacturing Company, St. Paul, Minn.

[21] Appl. No.: 551,903

[22] Filed: Oct. 23, 1995

Related U.S. Application Data

[63] Continuation-in-part of Ser. No. 248,404, May 24, 1994, abandoned.

[51] Int. Cl.[6] .................................................. G03B 42/02
[52] U.S. Cl. .................................................. 378/167; 378/177
[58] Field of Search .................................. 378/167, 172, 378/173, 174, 177

[56] References Cited

U.S. PATENT DOCUMENTS

| | | | |
|---|---|---|---|
| 4,346,300 | 8/1982 | Turner | 206/455 |
| 4,380,087 | 4/1983 | Tanaka | 378/186 |
| 4,538,294 | 8/1985 | Tamura et al. | 378/187 |
| 4,542,522 | 9/1985 | Blais | 378/167 |
| 4,613,984 | 9/1986 | Fisher et al. | 378/185 |
| 4,637,043 | 1/1987 | Bauer | 378/188 |
| 4,734,926 | 3/1988 | Singer et al. | 378/187 |
| 4,763,346 | 8/1988 | Niedospial et al. | 378/187 |
| 4,782,505 | 11/1988 | Ogo | 378/187 |
| 4,893,322 | 1/1990 | Hellmick et al. | 378/173 |
| 5,025,465 | 6/1991 | Bauer et al. | 378/169 |
| 5,101,423 | 3/1992 | Okamoto et al. | 378/182 |
| 5,146,484 | 9/1992 | Trumpp | 378/188 |
| 5,388,140 | 2/1995 | Robertson | 378/187 |

*Primary Examiner*—Craig E. Church
*Attorney, Agent, or Firm*—Gary L. Griswold; Walter N. Kirn, Jr.; Jeffrey J. Hohenshell

[57] ABSTRACT

The present invention provides an apparatus and a method for holding flexible cassettes such that the radiographic film loaded in the cassettes is in intimate contact with the intensifying screens in the cassettes, thereby improving the quality of radiographic images provided when using flexible cassettes.

21 Claims, 6 Drawing Sheets

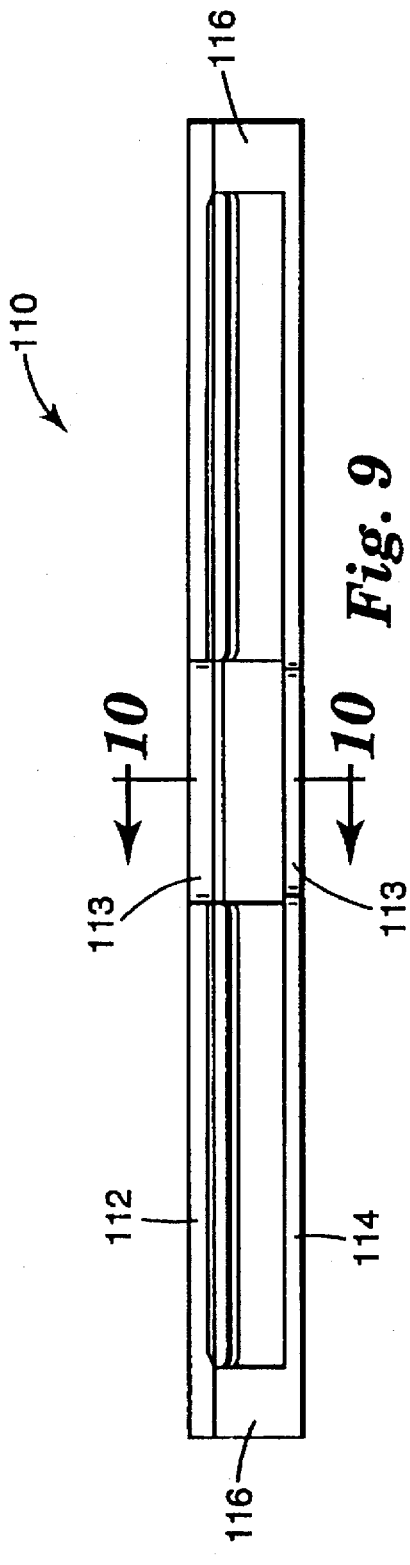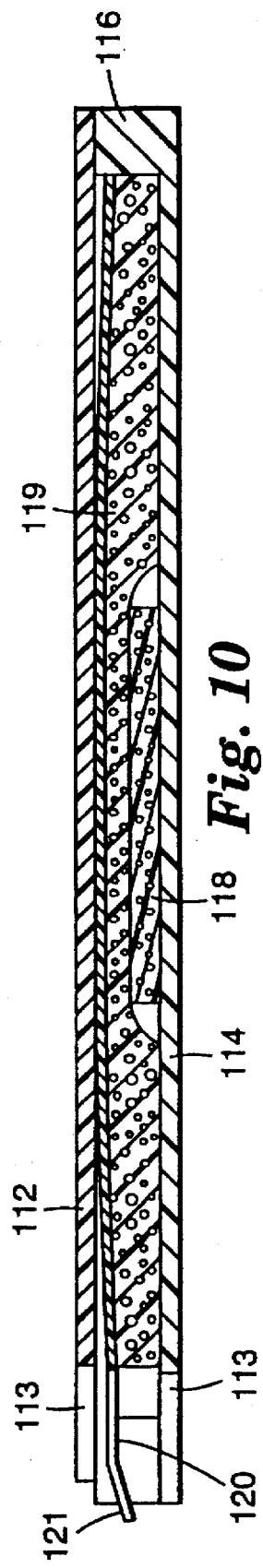

FLEXIBLE RADIOGRAPHIC CASSETTE HOLDER

RELATED APPLICATION

This application is a continuation-in-part of U.S. patent application Ser. No. 08/248,404 filed on May 24, 1994, now abandoned.

FIELD OF THE INVENTION

The present invention relates to the field of devices for providing film to screen contact in radiographic cassettes during exposure. More particularly, the present invention relates to devices for providing intimate film to screen contact in flexible radiographic cassettes.

BACKGROUND OF THE INVENTION

The use of metal cassettes for holding radiographic image film and intensifying screens in close proximity during imaging is well-known. The metal cassettes provide high quality images because they maintain a relatively constant pressure between the film and screen which results in the consistent contact between the film and screen. Contact is crucial for accuracy as any distance between the screens and film will cause distortion of the image in the radiograph. The metal cassettes typically force contact between the film and screen by using a lining of foam, felt or other resilient material which presses the film against the screen once the cassette is closed and latched.

Two of the primary disadvantages of conventional metal cassettes are their weight and relative bulk. These disadvantages are especially noticeable to veterinarians and other individuals who are required to take multiple radiographic images at remote locations.

One attempt at addressing the disadvantages associated with metal cassettes is the vinyl or flexible folder-type of cassette. The typical folder is made of opaque flexible vinyl with light-tight folds to protect the film from unwanted exposure. The primary advantages of flexible folders are their lighter weight and lower bulk. When compared to metal cassettes, flexible folders typically weigh less than one-fifth that of metal cassettes.

The flexible cassettes are, however, not without their own disadvantages. The primary disadvantage is a lower quality radiograph resulting from a lack of contact between the film and screen. The quality of the radiograph is, however, extremely important when making a diagnosis. As a restfit, users are forced to choose between the weight and bulk of metal cassettes or the lower quality images provided when using flexible cassettes.

SUMMARY OF THE INVENTION

The present invention provides an apparatus and a method for holding flexible cassettes such that the radiographic film loaded in the cassettes is in intimate contact with the intensifying screens in the cassettes, thereby improving the quality of radiographic images provided when using flexible cassettes.

In one aspect of the invention, an apparatus is provided which includes a substantially rigid top plate made of a relatively radio-lucent material, a base attached to the top plate, a pressure plate located between the top plate and the base, and a means of biasing the pressure plate in a position proximate the top plate. As a result, when loaded with radiographic film in a flexible cassette including intensifying screens, the pressure plate is forced against the cassette by the means of biasing, thereby moving the film and intensifying screens into intimate contact to maximize the resolution which can be achieved in the radiographic image.

In another aspect according to the present invention, a support housing is provided which includes a void accepting the apparatus described above. The support housing is preferably constructed to support the weight of a large animal, such as a horse, and may allow loading and unloading of flexible cassettes without moving the subject.

In yet another aspect according to the present invention, an apparatus is provided for holding a flexible cassette which itself provides sufficient weight bearing capabilities to withstand the weight of a horse or similarly sized animal.

Both of the weight-bearing variations of the present invention preferably include a layer of lead or other radio-dense material to prevent the effects of backscatter radiation on the resulting radiographic image. Likewise, the apparatus for holding the flexible cassettes may also include a layer of radio-dense material for the same purposes.

Advantages of the present invention include the ability to obtain high quality images using flexible radiographic cassettes while retaining the advantages of the flexible cassettes themselves, namely, significantly reduced weight and bulk as compared to standard metal cassettes.

Other advantages of the present invention include an apparatus or support housing with the ability to withstand the weight of a large animal or other subject. As a result, if multiple images are to be taken which require the subject to stand above the radiographic film, the subject may not need to be moved between images.

Yet another advantage of the present invention is, in the preferred embodiment, the ability to accurately place the flexible cassette during imaging as the marks used on the exterior of the flexible cassette to indicate the center of the film remain visible through a clear or translucent top plate. Alternately, target marks can be included on the visible surfaces of the support housing and/or apparatus for holding the film cassette in those instances where opaque materials are used.

These and other advantages of the various embodiments according to the present invention will become clearer upon a reading of the detailed description of the invention and with reference to the drawings and claims which form a part of this specification.

BRIEF DESCRIPTION OF THE DRAWINGS

FIG. 9 is a front view of an alternate embodiment of an apparatus for receiving a flexible radiographic cassette.

FIG. 10 is a cross-sectional view of the apparatus of FIG. 9, taken along line 10—10.

DETAILED DESCRIPTION OF THE INVENTION

Figure 1:
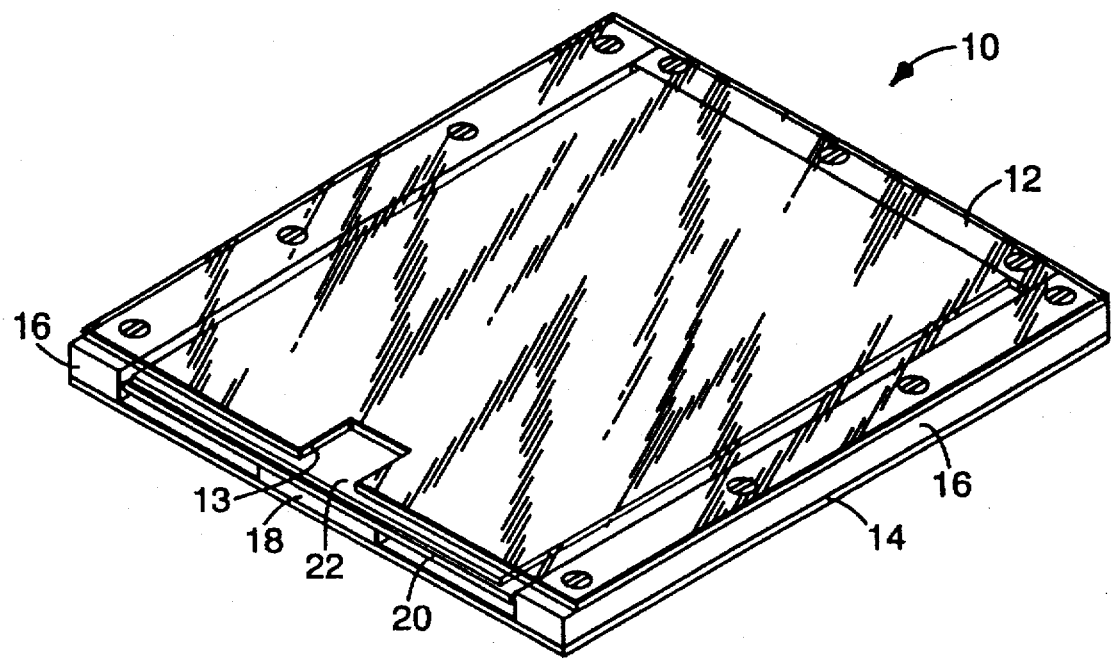
FIG. 1 is a perspective view of one embodiment of an apparatus for receiving a flexible radiographic cassette according to the present invention.
Figure 2:
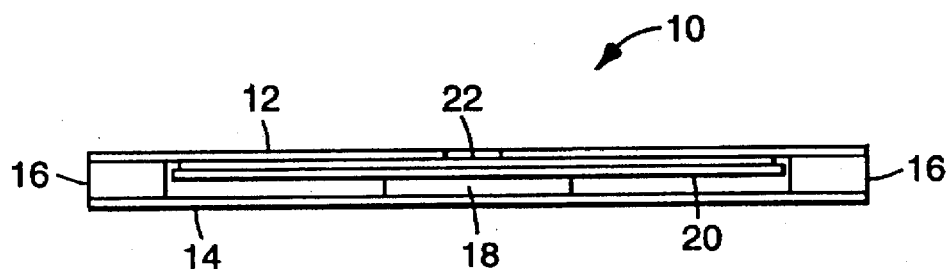
FIG. 2 is an end view of the opening into the interior of the apparatus pictured in FIG. 1.

FIGS. 1 & 2 depict one preferred embodiment of an apparatus 10 according to the present invention. The apparatus 10 includes a top plate 12, which is preferably made of a durable plastic such as acrylic or polycarbonate, bakelite or resin-based materials, or any radio-lucent material with the necessary strength and durability.

As used in connection with the present invention, the term "radio-lucent material" includes materials which allow the transmission of significant amounts of radiation used in radiography; the term "radio-dense material" includes materials which absorb a significant amount of radiation used in radiography; and the term "radio-reflective material" includes materials which reflect a significant amount of radiation used in radiography.

In one embodiment, top plate 12 is made of a clear or translucent material to allow viewing of a flexible radiographic cassette placed within apparatus 10. As a result, the target marks (not shown) on the surface of the cassette 22 are visible through the top plate 12, thereby providing a means for aiming the radiographic equipment at the center of the film. For simplicity, when the material used for top plate 12 is referred to below as transparent, that term includes any material allowing a user to view the target marks on the flexible cassette 22.

Alternately, the top plate 12 can be made of an opaque material, such as bakelite, with the means for aiming the radiographic equipment comprising target marks screened on the surface of the top plate 12.

Opposite top plate 12 is base 14, which is connected to top plate 12 through the use of side bars 16. The top plate 12, base 14 and side bars 16 are preferably connected with threaded fasteners as depicted, although many other means of fastening these portions of the apparatus 10 together could be substituted such as other mechanical fastening systems, adhesives, welding, etc.

It is, however, preferred that top plate 12 be removable to allow for cleaning of apparatus 10 and/or replacement of top plate 12.

Top plate 12 preferably includes a notch 13 to facilitate loading and unloading of the flexible cassette 22. Furthermore, the preferred top plate 12 does not extend to the end of base 14 on the notched side which also facilitates loading and unloading of flexible radiographic cassettes.

Once assembled, top plate 12, base 14, and side bars 16 cooperate to define an interior volume. A pressure plate 20 is located within that volume and is preferably biased in an upward position. The preferred means for biasing the pressure plate 20 in a position proximate top plate 12 is a foam material 18. Examples of suitable foam materials include, but are not limited to: polyurethane, polyester, polyether, polypropylene, polystyrene, polyethylene, neoprene, EVA, and PVC.

It will be understood that pressure plate 20 could be biased upward by any number of resilient systems including compression springs, spring steel strips, a wide variety of resilient materials, and many other equivalent means of forcing pressure plate 20 upward from base 14. Alternatively, it will also be understood that pressure plate 20 could be drawn towards top plate 12 by the use of springs in tension, appropriately shaped straps of spring steel or similar resilient materials and many other methods. The primary purpose of the means for biasing is to force pressure plate 20 in an upward position to compress cassette 22 against top plate 12, thereby providing intimate contact between the film and intensifying screens in the cassette.

The use of resilient foam material 18 as depicted in FIGS. 1 and 2 does provide advantages in that the force provided against pressure plate 20 is substantially uniform across the surface of the foam material 18. Furthermore, the preferred size of material 18 corresponds to the size of the area within the light-tight folds in cassette 22. As a result, the contact between the radiographic film and intensifying screens in radiographic cassette 22 is also substantially uniform in the area of material 18 to provide high resolution images.

In one embodiment, pressure plate 20 may flex in response to foam material 18, which may allow pressure plate 20 to provide more uniform pressure across the surface of flexible cassette 22. That feature may provide improved performance because the light-tight folds found around the perimeter of typical flexible cassettes restfit in an increased thickness at the perimeter and a narrowing of the cassette's thickness in the inner portion. For that reason, it may be advantageous to provide a pressure plate 20 which flexes to more uniformly compress the flexible cassette across its inner portion, thereby enhancing contact between the film and the screen in the cassette.

Alternately, it will be understood that pressure plate 20 could be provided with a varying thickness which would essentially, "mate" with the varying thickness of the radiographic cassette to accomplish the desired restfit of a more uniform pressure which, in turn, results in more uniform contact between the intensifying screens and radiographic film to provide higher resolution images.

The method of using apparatus 10 essentially comprises inserting a flexible radiographic cassette within the volume defined by top plate 12, base 14, and side bar 16. The cassette 22 is placed between pressure plate 20 and top plate 12 and is held in place by friction. Because the preferred embodiment of apparatus 10 includes a transparent top plate 12, the targeting marks on the surface of flexible cassette 22 remain visible for accurate aiming of the radiographic equipment at the image film Alternately, the top plate 12 could be opaque if positioning of the cassette 22 within apparatus 10 is accurately repeatable. In that situation, the exterior of top plate 12 would preferably be provided with targeting marks to aid in aiming the radiographic equipment at the film within the flexible cassette.

After each cassette 22 has been exposed, it is removed from apparatus 10 and replaced by an unexposed cassette to provide another radiographic image. As a result, the personnel obtaining the radiographic images need only transport a single apparatus 10 along with a desired number of flexible cassettes 22 to provide a plurality of high resolution radiographic images without the bulk and weight associated with transporting an equivalent number of metal cassettes.

Figure 3:
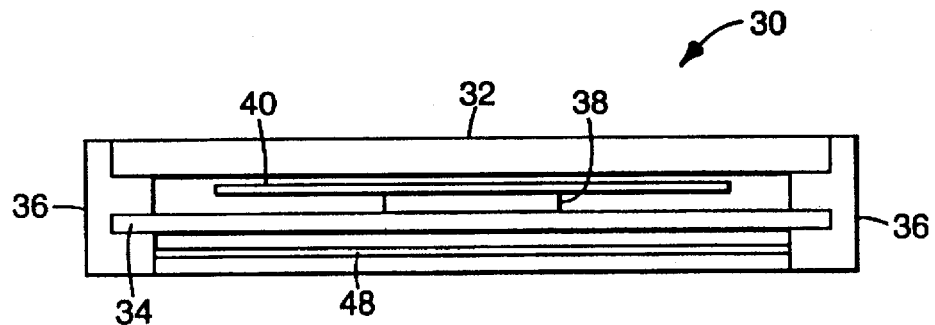
FIG. 3 is an end view of the opening into the interior of an alternative apparatus according to the present invention.

FIG. 3 depicts an alternate preferred embodiment according to the present invention. Apparatus 30 includes a top plate 32 which is significantly thicker than its counterpart top plate 12 in apparatus 10 of FIGS. 1 and 2. In addition, apparatus 30 includes significantly strengthened side bars 36. The heavier construction of apparatus 30 is provided to support a significant amount of weight placed on top plate 32 by a subject such as a horse or other large animal which may exert a force of 2400 pounds or greater when standing on apparatus 30 during As with apparatus 10 in FIGS. 1 and 2, top plate 32 is preferably formed of a durable material which is sufficiently strong to withstand the forces described above, while remaining transparent to the visual eye as well as being relatively radio-lucent. Alternatively, the top plate 32 can be opaque and include target marks provided on the surface of the top plate 32. In either version, the user can more accurately aim the radiographic equipment at the center of a film in a flexible cassette (not shown) placed in apparatus 30.

Apparatus 30 includes a base 34, a pressure plate 40, and means for biasing the pressure plate 40 in an upward position. In the embodiment depicted in FIG. 3, the means of biasing comprises a resilient foam material as described with respect to FIG. 10. The alternative means of biasing the pressure plate upward discussed with respect to apparatus 10 also apply to apparatus 30.

Apparatus 30 also includes an additional feature in that a layer 48 of radio-dense material is provided to prevent backscatter radiation from adversely affecting the image. Backscatter radiation is the phenomenon of reflected radiation which can adversely affect the quality of images formed during radiographic procedures. As apparatus 30 is specifically designed for placement on floors which may contain radio-reflective materials, the layer of radio-dense material 48 enhances the quality of images produced using apparatus 30.

Although radio-dense layer 48 is depicted as a separate layer, it will be understood that it could alternatively be incorporated into any of the portions of apparatus 30 which lie beneath a flexible cassette placed within apparatus 30 above pressure plate 40 and below top plate 32.

The outer surface of top plate 32 can also be provided with a slip-resistant finish, coating, material, etc. to improve the traction of animals standing on apparatus 30.

Apparatus 30 is used in much the same manner as apparatus 10, with the exception that apparatus 30 is more particularly designed for use in obtaining images in which the apparatus 30 is placed on the ground. As with apparatus 10, flexible radiographic cassettes are inserted into and removed from apparatus 30 as each image is taken.

Figure 4:
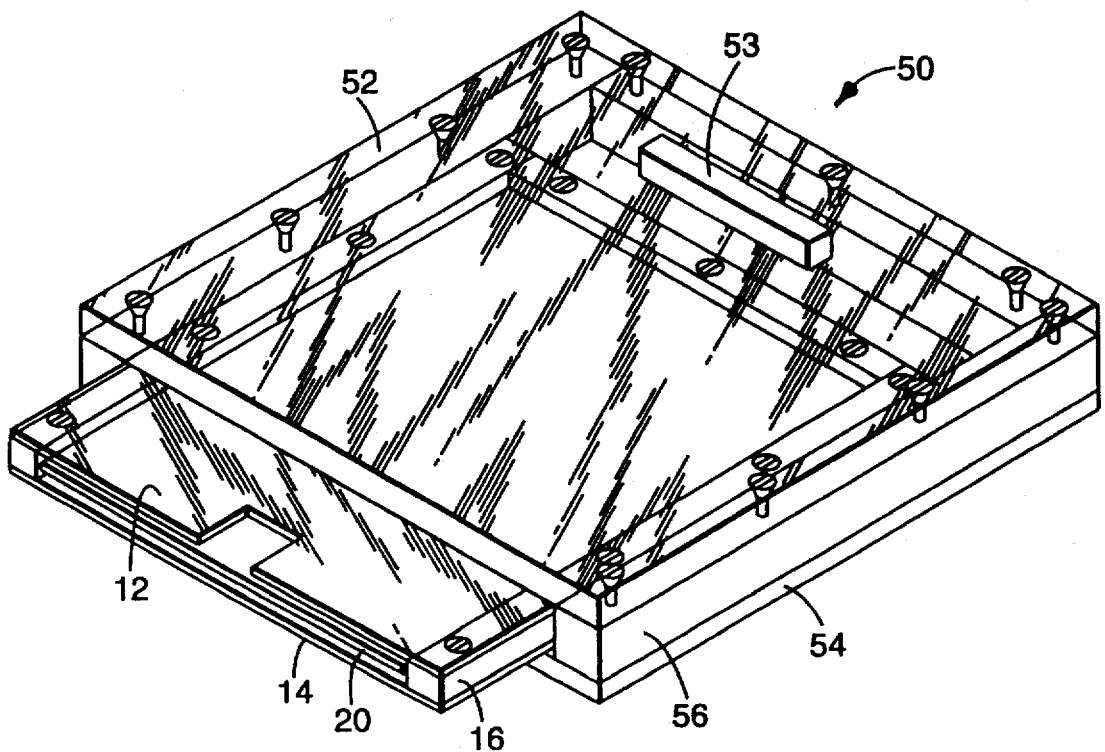
FIG. 4 is a perspective view of an apparatus according to the present invention partially in into a support housing according to the present invention.
Figure 5:
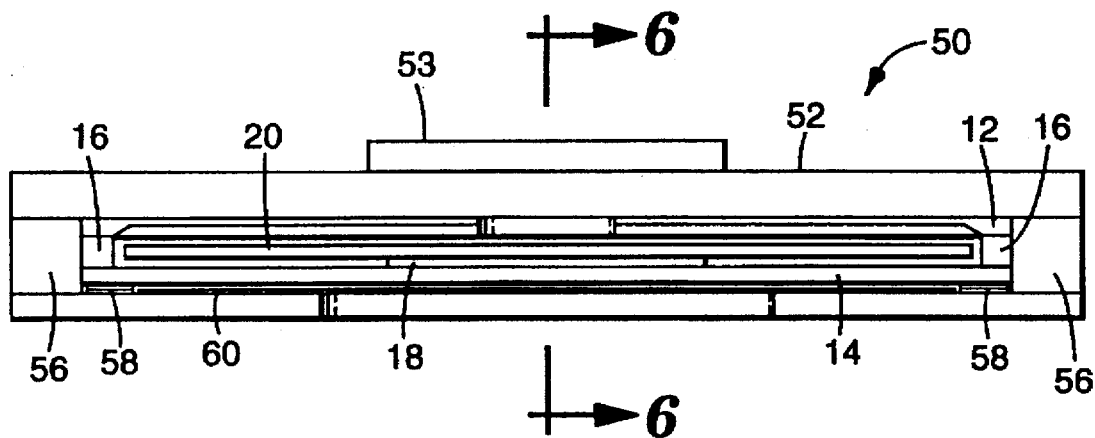
FIG. 5 is an end view of an apparatus according to the present invention is located within a support housing according to the present invention.
Figure 6:
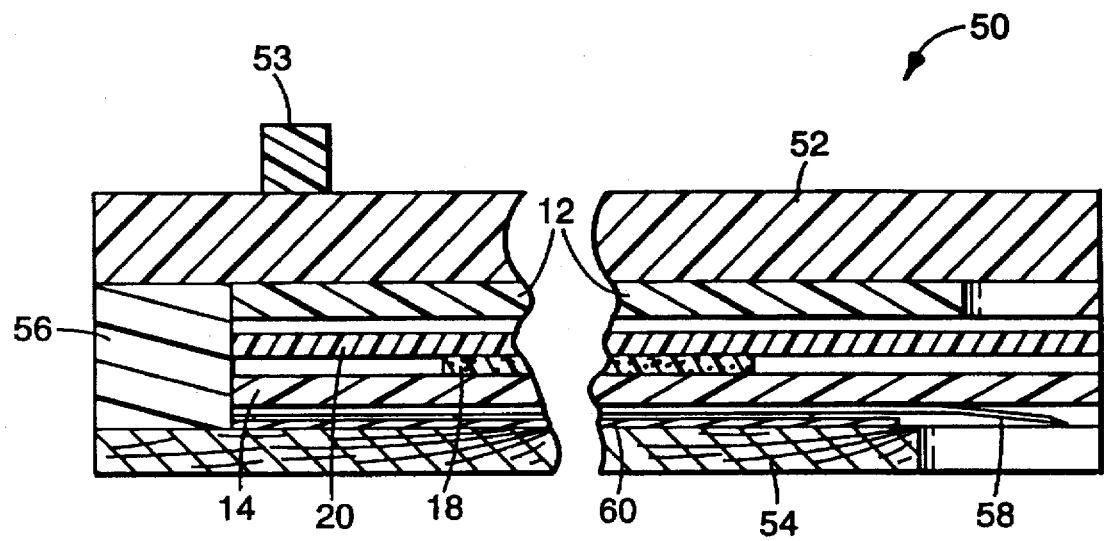
FIG. 6 is an enlarged, partial cross section of the apparatus and support housing depicted in FIG. 5, taken along line 6—6.

Turning now to FIGS. 4–6, another alternate embodiment of an apparatus according to the present invention is depicted. Support housing 50 is provided into which an apparatus 10 as depicted in FIGS. 1 and 2 (or apparatus 110 as described below) can be inserted during the imaging procedure. Support housing 50 includes a top plate 52, side bars 56, and a base 54. The side bars 56, top plate 52, and base 54 combine to form a volume into which an apparatus 10 is inserted during imaging. That volume created by base 54, top plate 52, and side plates 56 includes slides 58, which guide apparatus 10 into position within support housing 50. Slides 58 also preferably stabilize the position of apparatus 10 within support housing 50 by forcing it against top plate 52. In the preferred embodiment, slides 58 are constructed of a resilient material such as, for example, spring steel.

Apparatus 50 is preferably constructed with sufficient strength to withstand loads placed on top plate 52 by large animals such as horses, in a manner similar to that described for apparatus 30 above. In addition,, top plate 52 can be constructed of a transparent material to allow viewing of apparatus 10 within support housing 50 and, thereby, also allow the user to view the target marks on the cassette placed within apparatus 10. Alternately, top plate 52 could be provided of an opaque material with target marks provided on its surface if positioning of apparatus 10 within support housing 50 is accurately repeatable and likewise, the positioning of a cassette within apparatus 10 is also accurately repeatable.

Like top plate 32 of apparatus 30, top plate 52 of support housing 50 can also be provided with a slip-resistant finish, coating, material, etc. to improve the traction of animals standing on support housing 50.

In addition, stop 53 may also be attached to top plate 52 as shown in FIGS. 4 and 5. Stop 53 is useful to retain, in particular, a horse's hoof on top plate 52 in an accurately repeatable position.

A radio-dense layer 60 is preferably provided below apparatus 10 to combat the effects of backscatter radiation as described above. It will, of course, be understood that a radio-dense material could be incorporated into base 54 rather than being provided separately or, in yet another alternative, a radio-dense material could be provided as an additional layer in apparatus 10 or incorporated directly into base 14 or pressure plate 20 of apparatus 10.

The method of using support housing 50 depicted in FIGS. 4–6 varies only slightly from that described above for apparatus 10 & 30. The primary difference is that support housing 50 is provided only as a means of supporting a subject above an apparatus 10 which is not itself sufficiently sturdy to support the subject's weight.

In some instances, flexible radiographic cassettes may be placed within apparatus 10 while it remains in support housing 50. Alternately, apparatus 10 may need to be removed from support housing 50 to allow replacement of the flexible radiographic cassettes between images.

Figure 7:
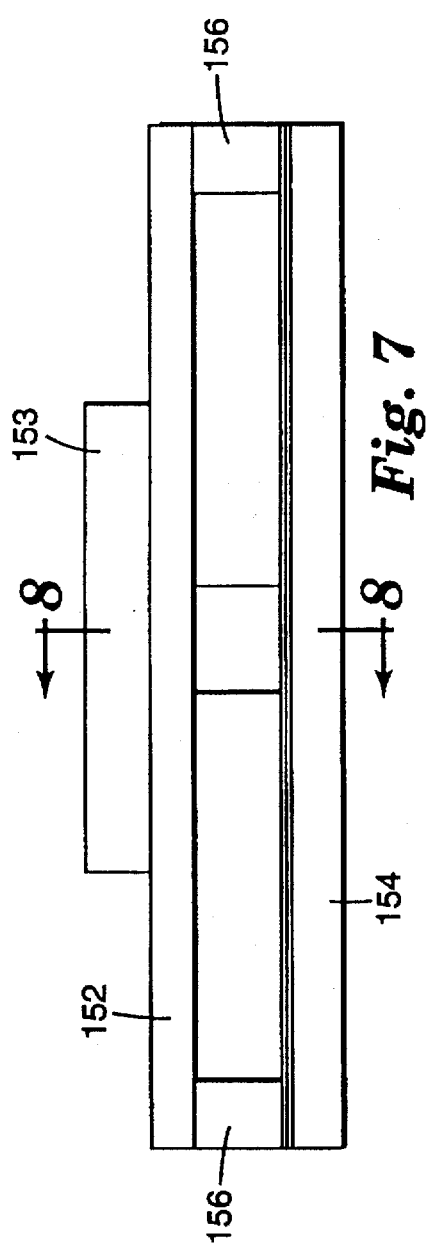
FIG. 7 is a front view of an alternate support housing according to the present invention.
Figure 8:
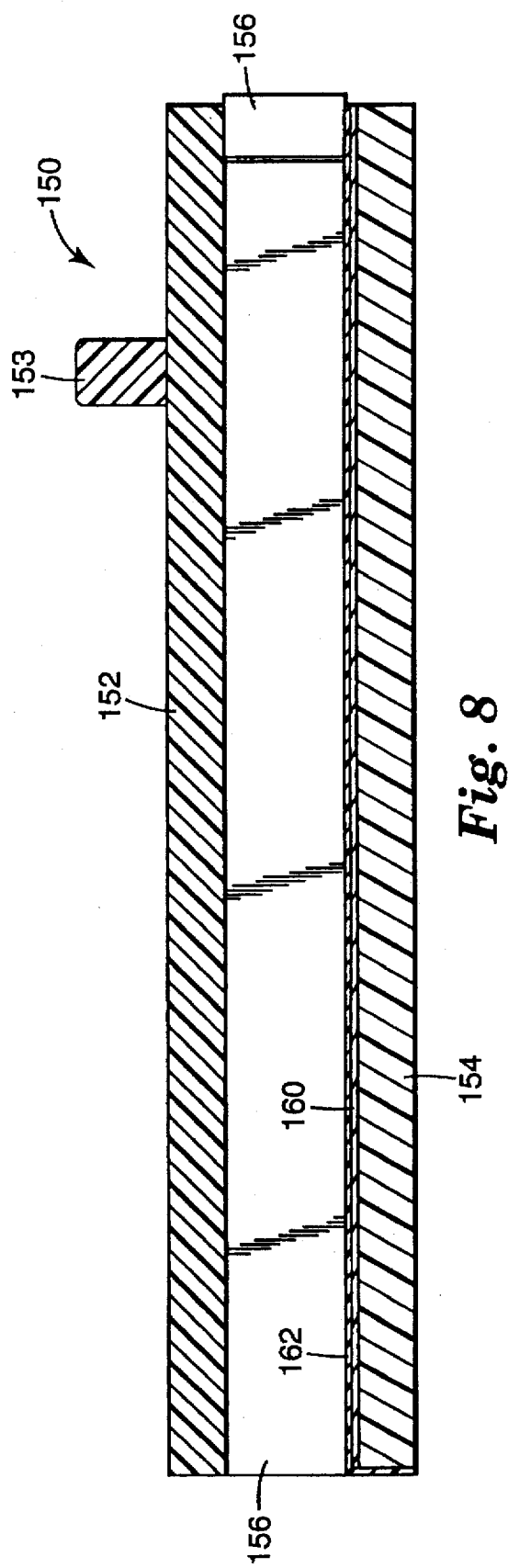
FIG. 8 is a cross-sectional view of the support housing of FIG. 7, taken along line 8—8.

FIGS. 7 & 8 depict an alternate support housing 150 into which an apparatus 10 as depicted in FIGS. 1 and 2 (or apparatus 110 as described below) can be inserted during the imaging procedure. Support housing 150 includes a top plate 152, side bars 156, and a base 154. The side bars 156, top plate 152, and base 154 combine to form a voile into which an apparatus 10 (or 110) is inserted during imaging. One difference between support housings 50 and 150 is that the embodiment designated by reference number 150 does not include the slides 58 described in conjunction with support housing 50.

Like apparatus 50, support housing 150 is also preferably constructed with sufficient strength to withstand loads placed on top plate 152 by large animals such as horses, in a manner similar to that described for apparatus 30 above. Top plate 152 can be constructed of a transparent material to allow viewing of apparatus 10 or 110 within support housing 150. Alternately, top plate 152 could be provided of an opaque material with target marks provided on its outer surface to assist in aiming radiographic equipment.

Like top plate 32 of apparatus 30, top plate 152 of support housing 150 can also be provided with a slip-resistant finish, coating, material, etc. to improve the traction of animals standing on support housing 150.

In addition, stop 153 may also be attached to top plate 152 as shown in FIGS. 7 and 8. Stop 153 is useful to retain, in particular, a horse's hoof on top plate 152 in an accurately repeatable position.

A radio-dense layer 160 is preferably provided on the base 154 of support housing 150 to combat the effects of backscatter radiation as described above. In the embodiment depicted in FIGS. 7 & 8, the radio-dense material 160 comprises a sheet of lead covered by a layer of plastic material 162. The plastic material is provided to protect the lead and prevent contact between it and the user. It will, of course, be understood that radio-dense material could be incorporated into base 154 rather than being provided separately or, in yet another alternative, a radio-dense material could be provided in the apparatus 10 or 110.

The method of using support housing 150 depicted in FIGS. 7 & 8 is that same as described with respect to support housing 50.

In some instances, flexible radiographic cassettes may be placed within apparatus 10 or 110 while they remain in support housing 150. Alternately, apparatus 10 or 110 may need to be removed from support housing 150 to allow replacement of the flexible radiographic cassettes between images.

Figure 11:
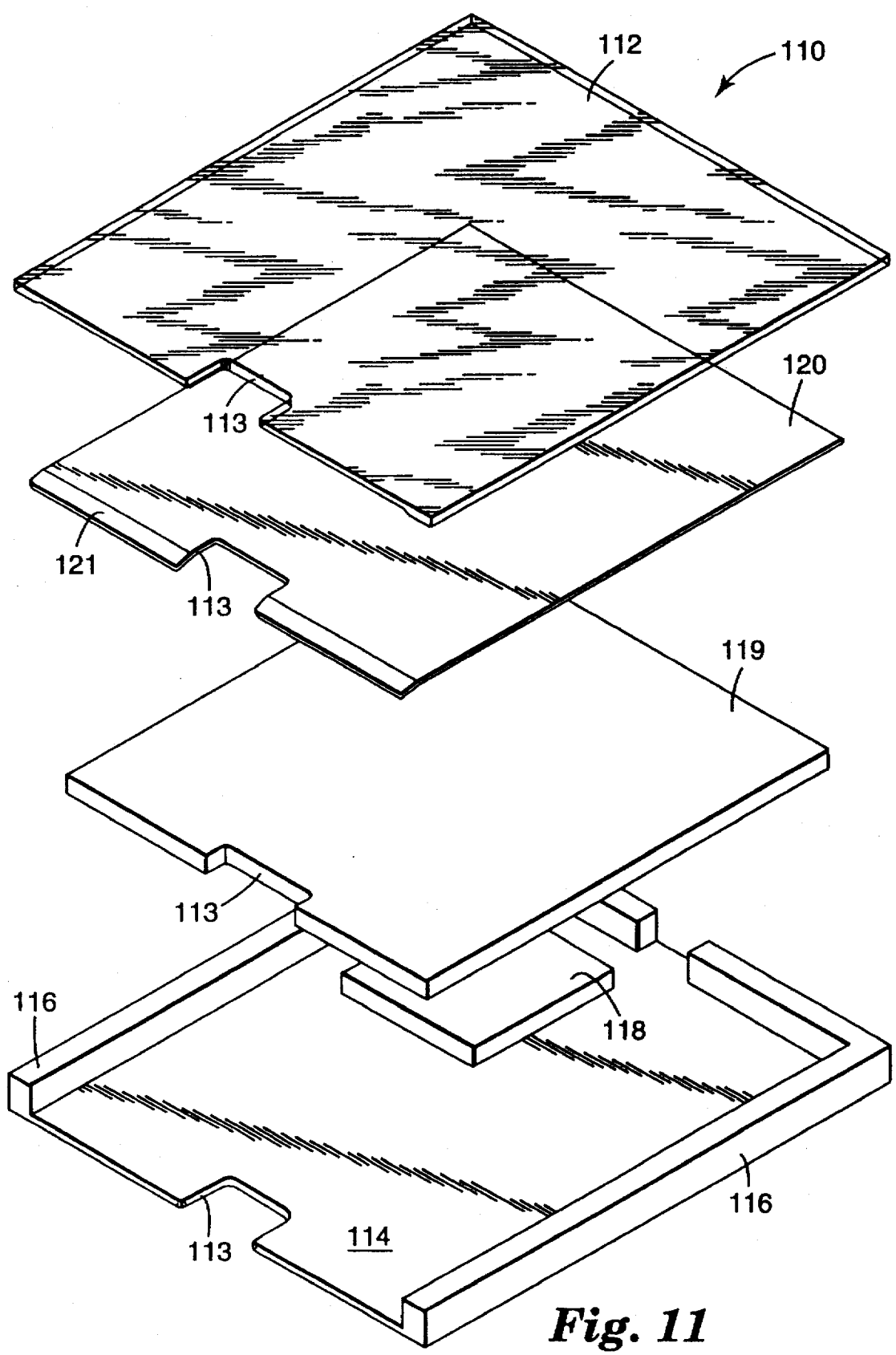
FIG. 11 is an exploded assembly drawing of the apparatus of FIGS. 9 and 10.

FIGS. 9–11 depict another embodiment of an apparatus 110, similar to apparatus 10 according to the present invention. The apparatus 110 includes a top plate 112, which is preferably made of a durable plastic such as acrylic or polycarbonate, bakelite or a similar radio-lucent material. The top plate 112 can be manufactured from clear or translucent materials to allow viewing of a flexible radiographic cassette placed within apparatus 110 or target marks can be provided on the outer surface of an opaque top plate 112.

Opposite top plate 112 is base 114, which is connected to top plate 112 through the use of side bars 116. In the pictured embodiment, the side bars 116 and base 114 are unitary, i.e., they are formed from a single piece of material. Suitable materials for the base 114 and side bars 116 are any materials with the necessary strength and durability. Some examples include UHMW, HDPE or other plastic materials, resin materials such as bakelite, etc.

The top plate 112, is preferably connected to the base 114 and side bars 116 with threaded fasteners, although many other means of fastening these portions of the apparatus 110 together could be substituted such as other mechanical fastening systems, adhesives, welding, etc. It is preferred, but not necessary, that top plate 112 be removable to allow for cleaning of apparatus 110 and/or replacement of top plate 112.

Both top plate 112 and base 114 preferably include notches 113 to facilitate loading and unloading of a flexible cassette (not shown) in the apparatus 110.

Once assembled, top plate 112, base 114, and side bars 116 cooperate to define an interior volume. A pressure plate 120 is located within that volume and is preferably biased in an upward position. The preferred means for biasing the pressure plate 120 in a position proximate top plate 112 is foam material 118 and 119 (which is more completely described below). It will be understood that pressure plate 120 could be biased upward by any number of resilient mechanisms described with respect to apparatus 10.

The pressure plate 120 depicted in FIGS. 9–11 has a front edge 121 curved downwardly to facilitate loading of flexible cassettes in the apparatus 110.

One primary difference between apparatus 10 and apparatus 110 is best seen with reference to FIG. 11. Where apparatus 10 uses a single piece of foam 118 to provide the desired amount of compression, alternate apparatus 110 incorporates two pieces of foam 118 and 119. This combination of foam pieces 118 and 119 provides for variable compression over the surface of flexible cassette with the area of highest compression provided by the combined thicknesses of foam pieces 118 and 119 located roughly between the light-tight folds in a flexible cassette.

In one embodiment, the space formed between the top plate 112 and base 114 is 0.5 inches (14 mm). Pressure plate 120 is formed out of nylon with a thickness of about 0.03 inches (0.9 mm). Foam piece 119 preferably extends over the entire area of the base 114 between sides 116 and has a thickness of about 0.370 inches (10.5 mm) while foam piece 118 is 3"×5"(8.5 cm×14.2 cm) with a thickness of 0.0625 inches (1.8 mm).

Foam layer 119 is preferably attached to pressure plate 120, base 114, and/or foam 118 with adhesives. Similarly, foam material 118 is preferably attached to foam layer 119 and/or base 114 with adhesives. It will be understood that a unitary piece of resilient foam having varying thicknesses over its surface could be provided in place of the two pieces of foam material described herein.

The preferred size of material 118 corresponds generally to the size of the area within the light-tight folds in a flexible radiographic cassette used in conjunction with the apparatus 110. As a result, the contact between the radiographic film and intensifying screens contained within radiographic cassette can be substantially uniform to provide high resolution images.

The foam pieces 118 and 119 can be provided of the same materials described above with respect to apparatus 10.

It is preferred that pressure plate 120 flex in response to the additional material located in the area of foam material 118. That flexing may provide improved performance because the light-tight folds found around the perimeter of typical flexible cassettes result in an increased thickness at the perimeter and a narrowing of the cassette's thickness in the inner portion. For that reason, it may be advantageous to provide a pressure plate 120 which flexes to more uniformly compress the flexible cassette across its inner portion.

Alternately, it will be understood that pressure plate 120 itself could be provided with a varying thickness which would essentially, "mate" with the varying thickness of the radiographic cassette to accomplish the desired result of a more uniform pressure which, in turn, results in more uniform contact between the intensifying screens and radiographic film to provide higher resolution images.

Apparatus 110 (or apparatus 10) may include a layer of radio-dense material, such as a lead film, attached to the pressure plate 120 or the base 114. Such a layer of radio-dense material can help prevent backscatter radiation from adversely affecting the image on the film.

The method of using apparatus 110 is the same as described above with respect to apparatus 10.

While various alternate preferred embodiments have been described in detail, it will be understood that variations may be made without departing from the scope and spirit of the invention as described in the claims below.

We claim:

1. An apparatus for providing intimate contact between radiographic film and screens contained in flexible cassettes the apparatus comprising:

a) a radio-lucent top plate;

b) a base fixedly attached to the top plate, the base and the top plate located in substantially parallel planes, the top plate and base defining a portable housing for receiving a flexible cassette;

c) a pressure plate located between the top plate and the base; and d) means for continuously biasing the pressure plate towards the top plate.

2. The apparatus of claim 1, wherein the pressure plate is substantially planar.

3. The apparatus of claim 1, wherein the pressure plate flexes in response to the means for biasing.

4. The apparatus of claim 1, wherein the means for biasing comprises resilient material located between the pressure plate and the base.

5. The apparatus of claim 4, wherein the resilient material is generally planar and has a generally constant thickness over its entire surface.

6. The apparatus of claim 4, wherein the resilient material is generally planar and further wherein the thickness of the resilient material proximate the center of the pressure plate is greater than the thickness of the resilient material proximate its perimeter.

7. The apparatus of claim 6, wherein the resilient material comprises first and second pieces of resilient material, the first and second pieces being generally planar.

8. The apparatus of claim 4, wherein the resilient material is polyether foam.

9. The apparatus of claim 1, further comprising means for aiming radiographic equipment at film located in a flexible cassette in the apparatus.

10. The apparatus of claim 1, further comprising a layer of radio-dense material.

11. An apparatus for providing intimate contact between radiographic film and screens contained in flexible cassettes, the apparatus comprising:
 a) a radio-lucent top plate;
 b) a base fixedly attached to the top plate, the base and the top plate located in substantially parallel planes, the top plate and base defining a portable housing for receiving a flexible cassette;
 c) a pressure plate located between the top plate and the base; and
 d) means for continuously biasing the pressure plate towards the top plate, the means for biasing comprising resilient material located between the pressure plate and the base.

12. A combination comprising:
 a) an apparatus for providing intimate contact between radiographic film and screens contained in flexible cassettes, the apparatus comprising:
  1) a radio-lucent first top plate;
  2) a base attached to the first top plate, the first top plate and base defining a portable housing for receiving a flexible cassette;
  3) a pressure plate located between the first top plate and the base;
  4) means for continuously biasing the pressure plate towards the first top plate; and
 b) a portable support housing for supporting a mass above the first top plate, the support housing comprising:
  1) a second top plate constructed of a radio-lucent material; and
  2) a support attached to and supporting the second top plate above the apparatus, the second top plate and support cooperating to define a volume in which the apparatus is removably located.

13. The combination of claim 12, further comprising a layer of radio-dense material below the first top plate.

14. The combination of claim 12, further comprising means for aiming radiographic equipment at film located in a flexible cassette in the apparatus.

15. The combination of claim 12, further comprising means for continuously biasing the apparatus in an upper position proximate the second top plate of the support housing.

16. A combination comprising:
 a) a portable apparatus for providing intimate contact between radiographic film and screens contained in flexible cassettes, the apparatus comprising:
  1) a radio-lucent first top plate;
  2) a base fixedly attached to the first top plate, the base and the first top plate located in substantially parallel planes, the first top plate and base defining a portable housing for receiving a flexible cassette;
  3) a pressure plate located between the first top plate and the base;
  4) means for continuously biasing the pressure plate towards the first top plate, the means for biasing comprising resilient material located between the pressure plate and the base; and
 b) a portable support housing for supporting a mass above the first top plate, the support housing comprising:
  1) a second top plate constructed of a radio-lucent material; and
  2) a support attached to and supporting the second top plate above the apparatus, the second top plate and support cooperating to define a volume in which the apparatus is removably located.

17. A method of imaging radiographic film in a flexible cassette, comprising the steps of:
 a) manually inserting the flexible cassette into a portable apparatus for providing intimate contact between radiographic film and screens contained in flexible cassettes, the apparatus comprising:
  1) a radio-lucent first top plate;
  2) a base fixedly attached to the first top plate, the base and the first top plate located in substantially parallel planes, the first top plate and base defining a portable housing for receiving a flexible cassette;
  3) a pressure plate located between the first top plate and the base;
  4) means for continuously biasing the pressure plate towards the first top plate, wherein the flexible cassette is forced against the first top plate; and;
 b) placing the apparatus in position proximate an object to be imaged; and
 c) directing radiation through the object and at the apparatus.

18. The method of claim 17, wherein the step of inserting the flexible cassette further comprises sliding the flexible cassette between the top plate and pressure plate.

19. The method of claim 17, wherein the apparatus further comprises means for aiming radiographic equipment at the film located in the apparatus.

20. The method of claim 17, wherein the step of placing the apparatus further comprises placing the apparatus within a support housing.

21. A method of imaging radiographic film in a flexible cassette, comprising the steps of:
 a) inserting the flexible cassette into portable apparatus for providing intimate contact between radiographic film and screens contained in flexible cassettes, the apparatus comprising:
  1) a radio-lucent first top plate;
  2) a base fixedly attached to the first top plate, the base and the first top plate located in substantially parallel planes, the first top plate and base defining a portable housing for receiving a flexible cassette;
  3) a pressure plate located between the first top plate and the base;
  4) means for continuously biasing the pressure plate towards the first top plate;

5) an opening between the top plate and base; wherein the step of inserting the flexible cassette further comprises manually sliding the flexible cassette between the top plate and pressure plate, wherein the flexible cassette is forced against the first top plate; and b) placing the apparatus in position proximate an object to be imaged; and c) directing radiation through the object and at the flexible cassette.

* * * * *